United States Patent
Wyant

(10) Patent No.: US 12,083,057 B1
(45) Date of Patent: Sep. 10, 2024

(54) ELECTRIC VAN

(71) Applicant: Eileen Wyant, Holiday, FL (US)

(72) Inventor: Eileen Wyant, Holiday, FL (US)

(*) Notice: Subject to any disclaimer, the term of this patent is extended or adjusted under 35 U.S.C. 154(b) by 323 days.

(21) Appl. No.: 17/706,066

(22) Filed: Mar. 28, 2022

(51) Int. Cl.
*A61G 3/06* (2006.01)
*A61G 3/08* (2006.01)
*B60N 2/24* (2006.01)
*B60N 3/00* (2006.01)
*B60N 3/10* (2006.01)

(52) U.S. Cl.
CPC ........... *A61G 3/062* (2013.01); *A61G 3/0808* (2013.01); *B60N 2/245* (2013.01); *B60N 3/004* (2013.01); *B60N 3/10* (2013.01); *B60Y 2200/11* (2013.01); *B60Y 2200/91* (2013.01)

(58) Field of Classification Search
CPC .............................. A61G 3/062; A61G 3/0808
See application file for complete search history.

(56) References Cited

U.S. PATENT DOCUMENTS

| | | | | |
|---|---|---|---|---|
| 4,071,152 A | * | 1/1978 | Kinkead | A61G 3/0808 414/545 |
| 7,207,765 B1 | * | 4/2007 | Egan | A61G 3/062 414/539 |
| 8,403,615 B1 | * | 3/2013 | McGlinn | B60P 1/4457 414/549 |
| 10,183,584 B2 | * | 1/2019 | Ricci | B60L 53/32 |
| 10,413,459 B2 | | 9/2019 | Teden | |
| 10,589,652 B2 | | 3/2020 | Preisler et al. | |
| 2020/0155869 A1 | * | 5/2020 | Chamberlain | B60P 3/00 |
| 2020/0215934 A1 | * | 7/2020 | Gomez | B60N 2/753 |

FOREIGN PATENT DOCUMENTS

CN 112622738 A * 4/2021 ............. A61G 3/062

OTHER PUBLICATIONS

CN 112622738 A (Tian) Apr. 9, 2021 (English language machine translation). [online] [retrieved Apr. 10, 2024]. Retrieved from: espacenet. (Year: 2021).*

* cited by examiner

*Primary Examiner* — Jonathan Snelting
(74) *Attorney, Agent, or Firm* — Sanchelima & Associates, P.A.; Christian Sanchelima; Jesus Sanchelima

(57) ABSTRACT

An electric van including a van assembly, a power assembly, a lifting assembly, and an interior assembly. Said van assembly includes a van having a van interior. The power assembly includes an electric power train that generates the power needed to move said van. The lift assembly includes a wheelchair lift that is attached to the chassis of the van in order to prevent the entrance of the van to be blocked in case of an accident. The interior assembly is enclosed by said van interior. The interior assembly includes a divider, foldable seats, a bar, locking mechanisms, captain chairs having foldable desks, and a sofa. The interior assembly defines a luxury interior to provide comfort to users. The locking mechanisms permits to secure wheelchairs that enter there by means of the wheelchair lift.

1 Claim, 6 Drawing Sheets

ELECTRIC VAN

II. BACKGROUND OF THE INVENTION

1. Field of the Invention

The present invention relates to an electric van and, more particularly, to an electric van that has a wheelchair lift and a luxury interior.

2. Description of the Related Art

Several designs for electric vans have been designed in the past. None of them, however, include a wheelchair lift attached to the chassis of the van to prevent possible obstructions to the entrance in case of an accident, an electric power train and a luxury interior.

Applicant believes that a related reference corresponds to U.S. Pat. No. 10,413,459 issued for a wheelchair accessible vehicle which includes a vehicle that has a plurality of entries. Applicant believes that another related reference corresponds to U.S. Pat. No. 10,589,652 issued for a mechanized tray table attached to the back of a vehicle seat. None of these references, however, teach of a van having multiple methods of providing power, which includes an electric power train, a wheelchair lift, and fold down desks attached to the back of chairs.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an electric van that includes a wheelchair lift attached to the chassis of the van. By attaching it to the chassis and not to the entrance it prevents possible obstructions to the entrance of the van in case of an accident or emergency.

It is another object of this invention to provide an electric van that includes an electric power train to reduce carbon footprint.

It is still another object of the present invention to provide an electric van that has a luxury interior and provides independence, freedom of the road for all, does not matter if the user is impaired or not.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a lateral perspective view, partially broken away, of the electric van 10 having a wheelchair lift 42 from the lifting assembly 40.

FIG. 2 shows a schematic view showing the disposition of the interior assembly 80 with respect to the front of the van 22.

FIG. 3 illustrates an oblique cross section of the interior assembly 80 having foldable seats 82, locking mechanisms 84, a bar 83, captain chairs 85, foldable desks 86 and a sofa 87.

FIG. 4 is a representation of a perspective view of the van interior 28 showing one embodiment of the divider 81, the bar 83, and foldable seats 82.

V. DETAILED DESCRIPTION OF THE EMBODIMENTS OF THE INVENTION

Figure 1:
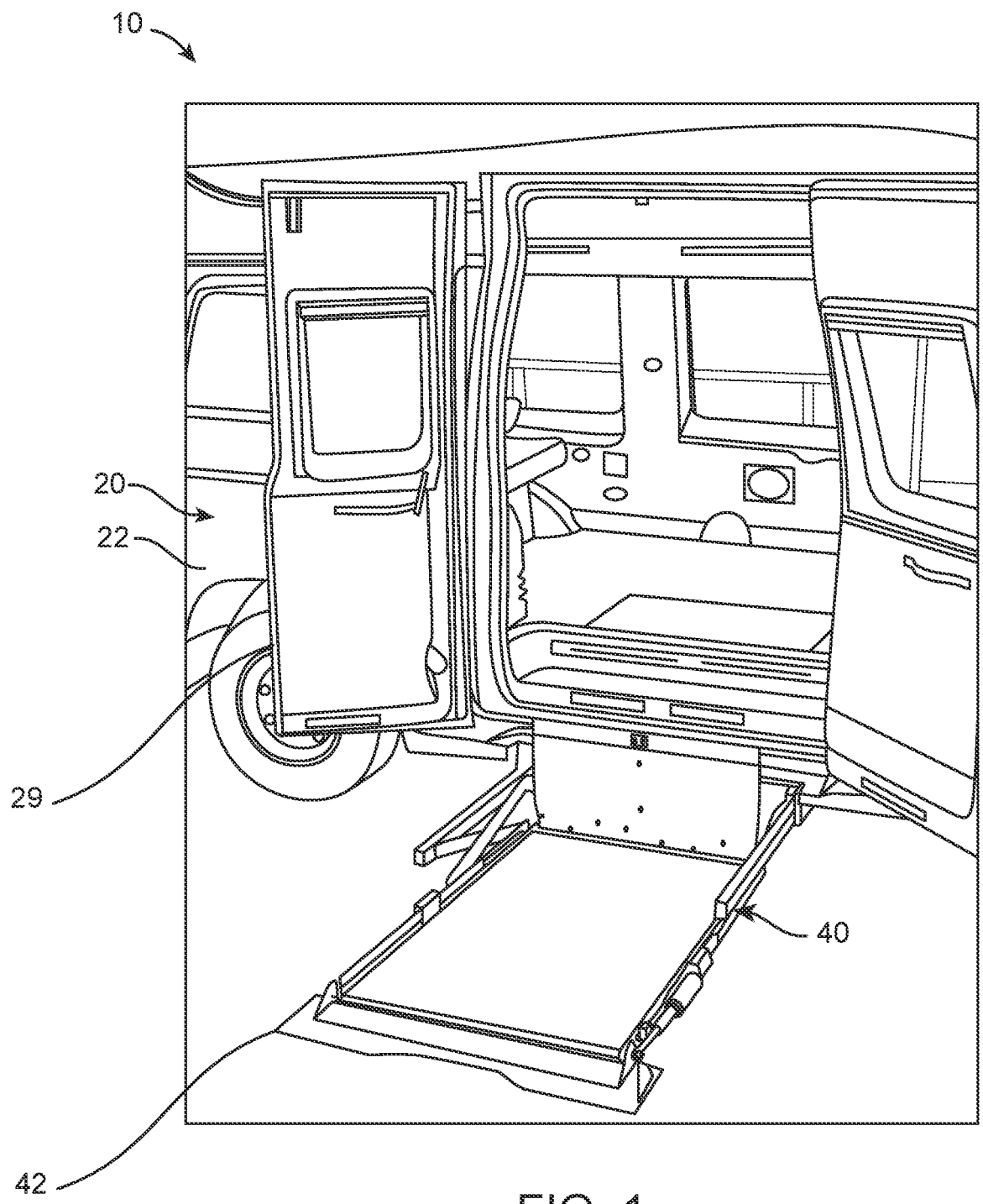
Figure 2:
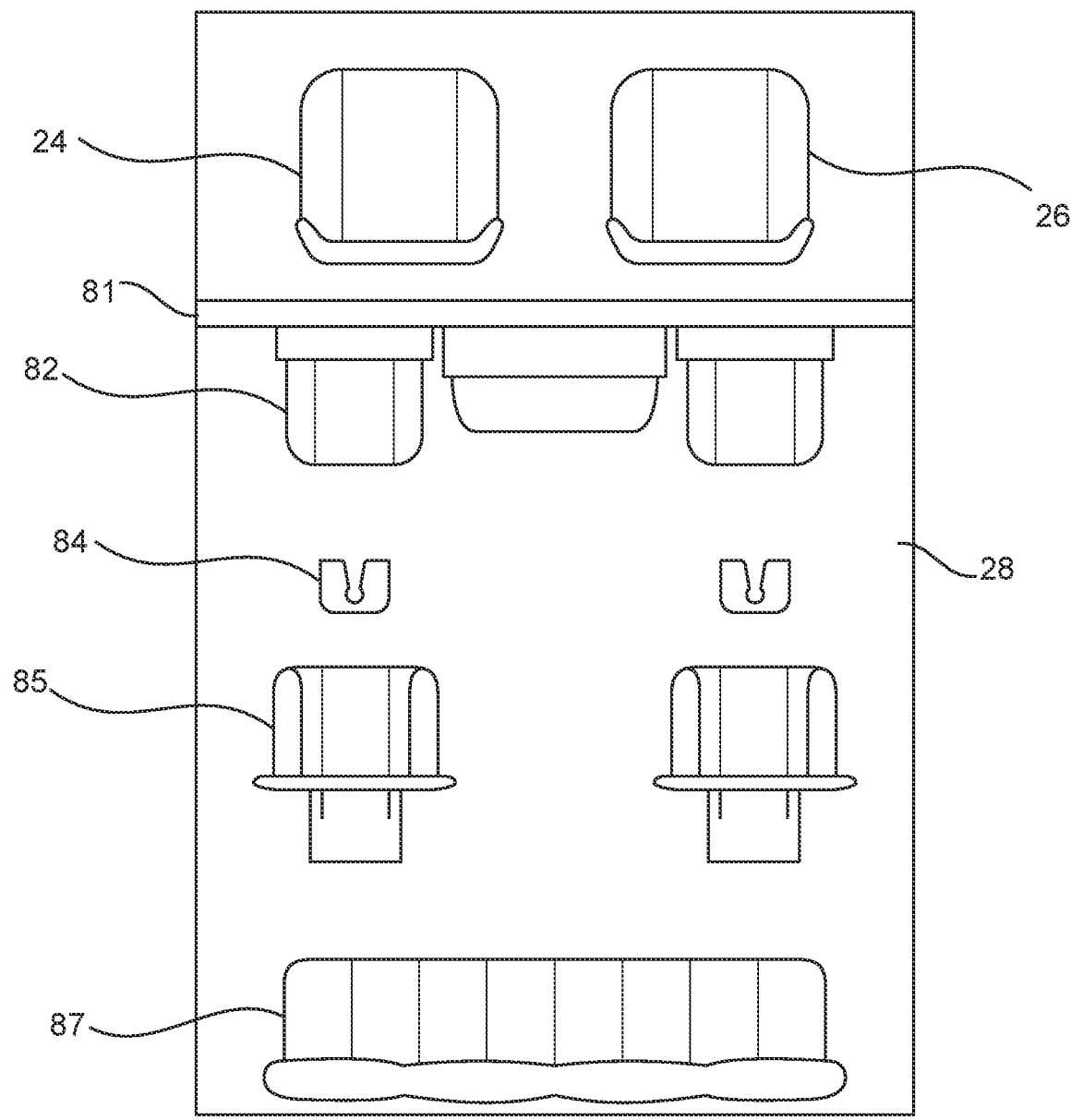
Figure 3:
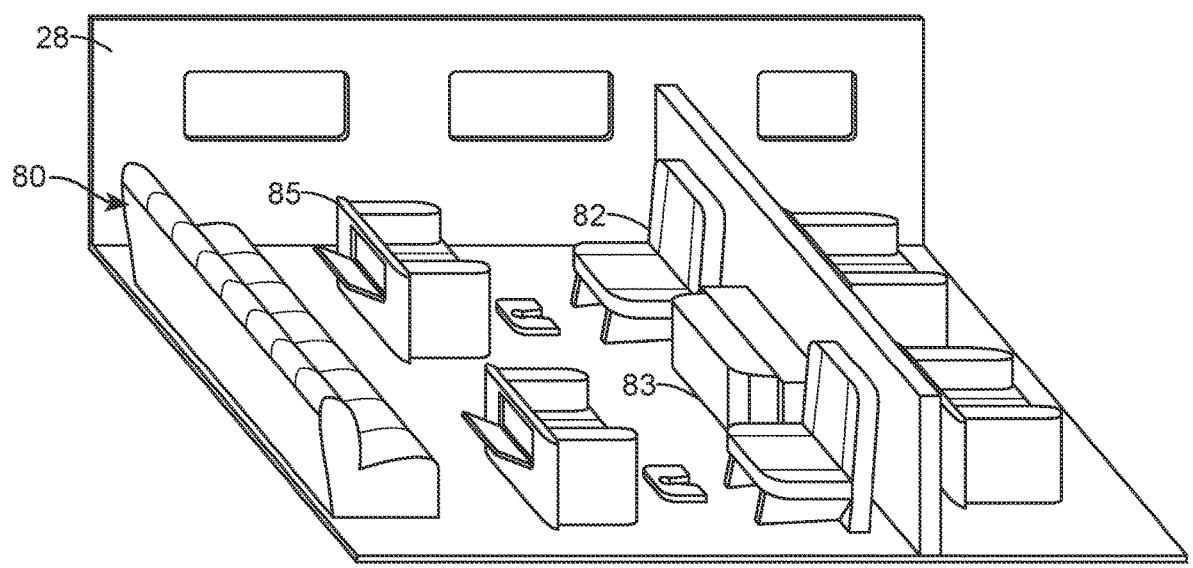

Referring now to the drawings, where the present invention is generally referred to with numeral 10, it can be observed that it basically includes a van assembly 20, a lifting assembly 40, power assembly 60, and an interior assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The van assembly 20 includes a van 22. Van 22 may be a medium-sized motor vehicle with a substantially cuboid shape that may be used for transporting goods or people. Van 22 may be a microvan such as mini MPV, compact MPV, a MPV van or the like. Van 22 may also be a medium van, a large van, a box van, a crew van, or any other suitable van as known in the art. Van 22 may include a high roof. Van 22 may include a driver seat 24, passenger seat 26, and a van interior 28. The van 22 may include an entrance 29. In a suitable embodiments, said entrance 29 may be comprised of a set of double doors that when opened permit the user to enter the van interior 28. In another embodiment, the entrance 29 may include a sliding door. Nonetheless, it should be understood that the aforementioned elements that the van 22 may include are for explanatory purposes, and do not limit the van to include exclusively those elements.

Better shown in FIG. 1 the lifting assembly 40 includes a wheelchair lift 42 that is mounted to a chassis (not shown in the figures) of the van 22. The wheelchair lift 42 may be made of carbon steel, alloy steel, stainless steel, tool steel, brass, bronze, iron, aluminum, nickel-based alloy, ceramics, polymers, fibers, metal alloy, composite materials, or any variation thereof. The wheelchair lift 42 may include a movable platform that has a suitable area to receive wheelchairs thereon. Wheelchair lift 42 may have a hydraulic, pneumatic, or mechanic actuation mechanism that allows the platform to be raised/lower to permit a wheelchair to be introduced inside the van interior 28. In one embodiment, the wheelchair lift 42 may be controlled wirelessly using remote controlled. In another embodiment, the van 22 may include a control panel to operate the wheelchair lift 42. Wheelchair lift 42 may include devices such as sensors or the like to prevent the usage of the wheelchair lift 42 in unsafe conditions. Wheelchair lift 42 attached to the chassis of the van may prevent possible obstructions to the entrance 29 in case of an accident, emergency, or the like. In other embodiments, the wheelchair lift 42 may have different structures and elements as known in the art. It should be understood that the aforementioned elements and functions that the wheelchair 22 may include are for explanatory purposes, and do not limit the wheelchair lift to include exclusively those elements.

Figure 6:
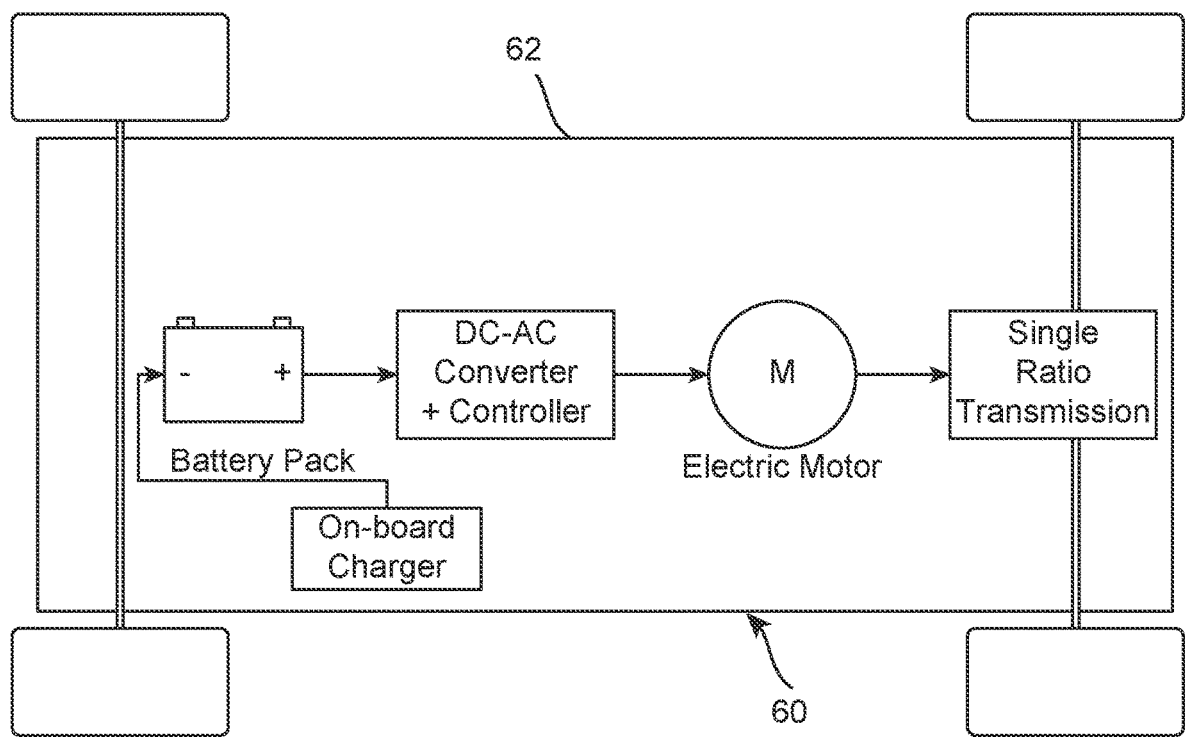
FIG. 6 is a schematic view of the power assembly 60 including an electric power train 62.

The power assembly 60 may include an electric power train 62. The electric power train 62 may be a set of components that generate the power that is delivered to the wheels to move the van 22. As shown in the FIG. 6 the core components of the electric power train 62 may be an on board charger, a battery pack, a D.C. to A.C. converter, an electric motor, and a transmission that drives the wheels. The on board charger may permit the van 22 to be charged using an A.C. charger or a D.C. charger. In an embodiment wherein a D.C. charger may be used, the battery pack may be directly charged, and the on board charger may be bypassed. In another embodiment wherein an A.C. charger may be used, the on board charger may be used to convert the A.C. to D.C. The D.C. may be used to charge the battery pack. On board charge may also be used to control the amount of current that flows into the battery pack. Battery pack may provide a D.C. output. Battery pack may include a battery management system that may continuously monitors the state of the battery pack and may be responsible for taking necessary measurements in case of a malfunction. The D.C. output supplied by the battery may be received by the DC-AC, which may convert D.C. to A.C. The controller may be a motor control mechanism that may be defined as powertrain electric control unit. The powertrain electric control unit may control the frequency and the magnitude of the voltage supplied to the electric motor. The intention of the controller is to manage the speed and acceleration as per driver's instructions. The electric motor converts electric energy to mechanical energy that is transmitted to run the wheels. It should be understood that the electric power train 62 may include more elements or variations of them as it is widely known in the art. Said sofa 87 may face the front of the vehicle.

Figure 4:
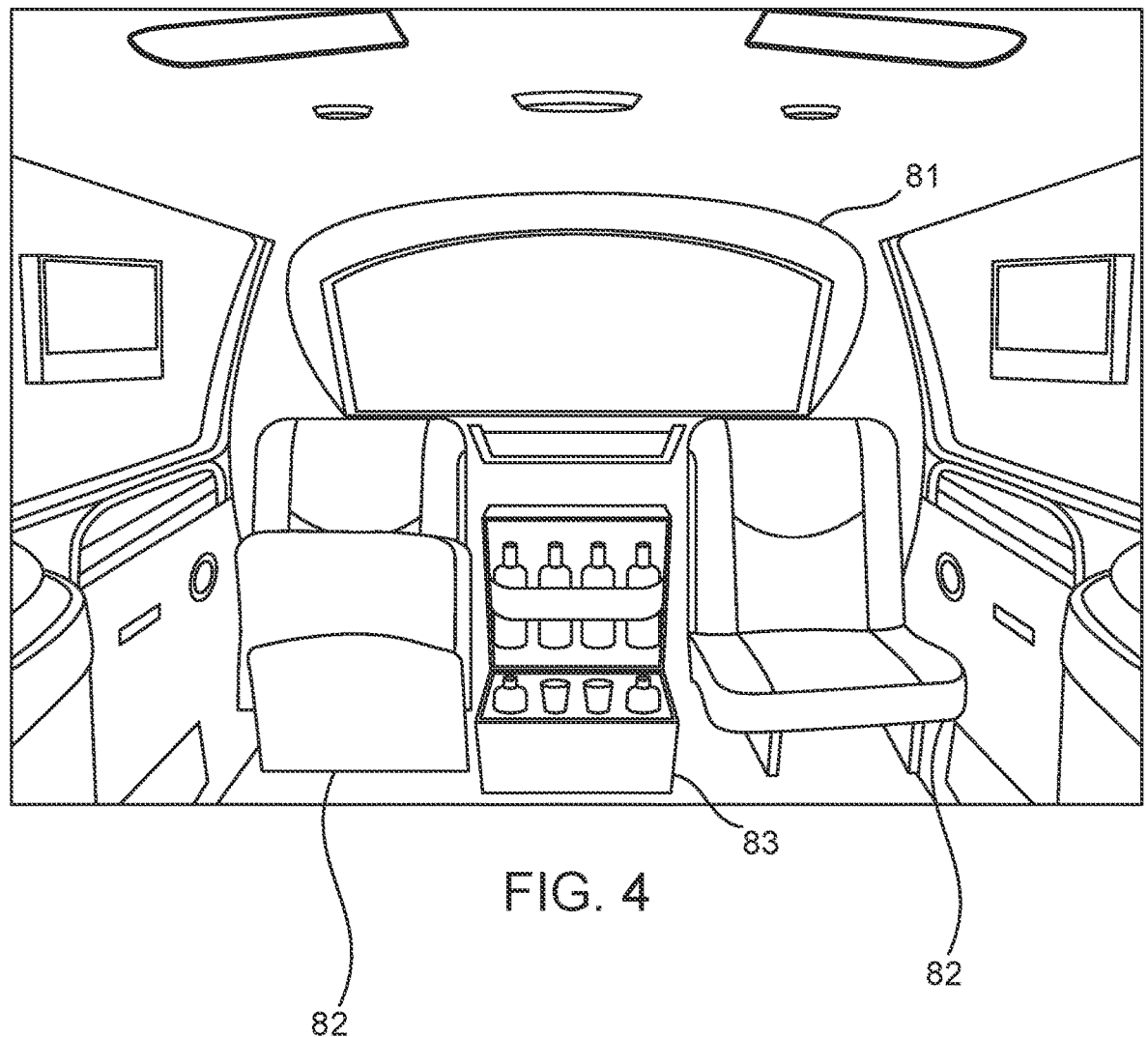
Figure 5:
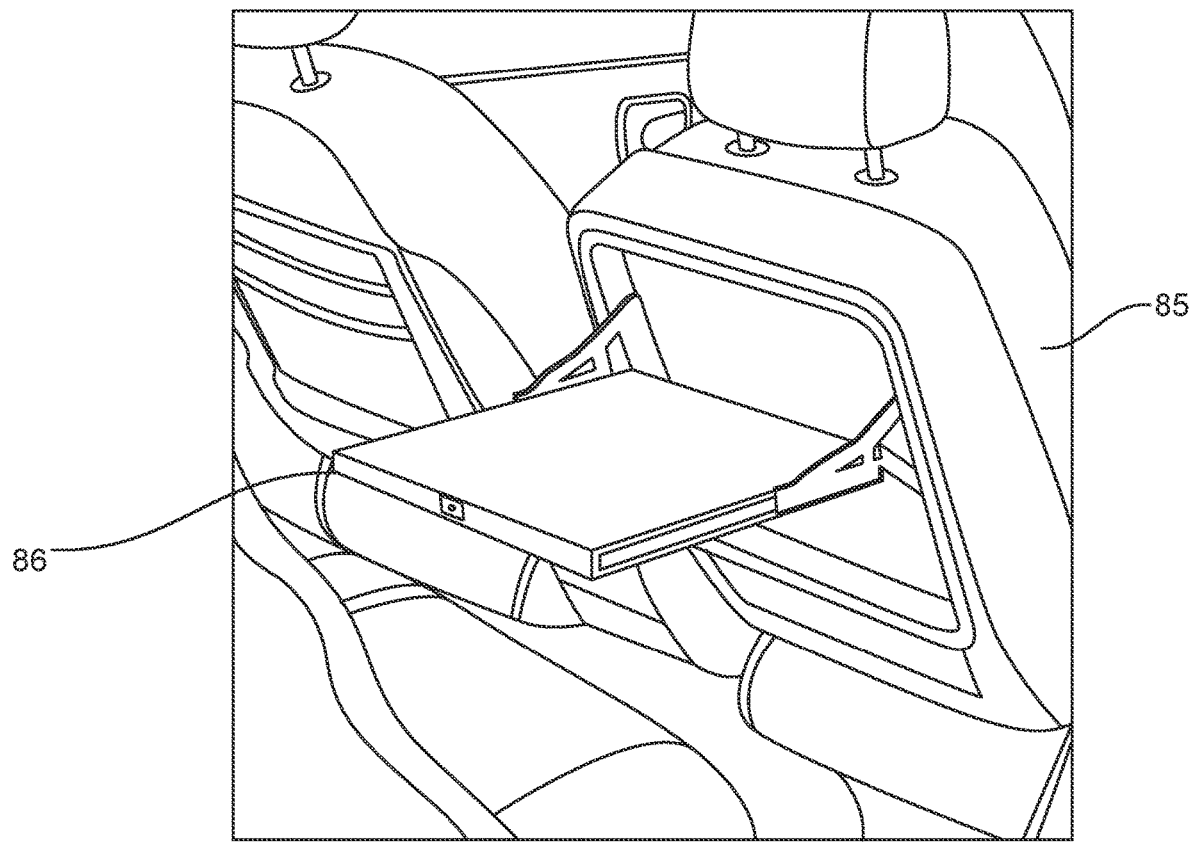
FIG. 5 is a perspective rear view of the captain chair 85 having a foldable desk 86.

The interior assembly 80 may include a divider 81, foldable seats 82, a bar 83, locking mechanisms 84, captain chairs 85, foldable desks 86, and a sofa 87. The interior assembly 80 may be located in the van interior 28. The divider 81 may be located behind the driver seat 24 and the passenger seat 26. The divider 81 spans the entire width of the van interior 28. In a suitable embodiment, the divider 81 may include electrically powered window or screen as shown in FIG. 4. Mounting on the divider 81 facing the van interior 28 may be located a bar 83. The bar 83 may be centrally placed and in abutting contact with the divider 81. The bar 83 may be volumetrically suitable to receive bottles, glasses, and the like. Bar 83 may include a cooling system. At lateral sides of the bar 83 there may be foldable seats 82. The foldable seats 82 may be facing the van interior 28. The foldable seats 82 fold outward toward the back of the van 22. Foldable seats 82 may be made of metal, leather, textile, polymers, ceramics, synthetic or natural fibers, or the like. The captain chairs 85 may be separated from each other a predetermined distance. Each captain chair 85 may be a stand-alone seat that may form a second row of seats, wherein the first row may be defined by the foldable seats 82. In one embodiment, the captain chairs 85 may face the back of the van 22. In another embodiment the captain chairs 85 may face the divider 81. The locking mechanisms 84 may permit to secure a wheelchair to the floor of the van 22. The locking mechanisms 84 may be separated from each other a predetermined distance. The locking mechanisms 84 may be made of metal, steel, metal alloys, ceramics, fibers, aluminum, polymers, or any variation thereof. Each captain chair 85 may include a foldable desk 86. Each foldable desk form the foldable desks 86 folds outward toward the back of the van. The foldable desks 86 may be made of sandalwood, purple heart wood, pink ivory, agar wood, African blackwood, bocote wood, ebony wood, metal, platinum, polymers, or any variation thereof. At the back of the van 22 there may be a sofa 87. Said sofa 87 may span the entire width of the van 22. The sofa 87 may be a fabric sofa, leatherettes sofa, a wooden sofa, a lounger sofa, or any other suitable sofa as known in the art. The aforementioned elements define a luxury interior. Additionally said van 22 may include charging ports, air conditioning system, and any other suitable element as known in the art to provide comfort inside a vehicle as known in the art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electric van, consisting of:
   a van assembly including a van, said van having a driver seat, a passenger seat, an entrance, and a van interior;
   a power assembly including an electric power train that generates the power that is needed to move the van;
   a lift assembly including a wheelchair lift attached a chassis of said van and proximal to said entrance; and
   an interior assembly including captain chairs with foldable desks attached to a rear portion thereof, a divider, foldable seats, locking mechanisms, and a sofa, said foldable seats and said bar are in abutting contact with said divider and facing to a back of the van, said bar is located between said foldable seats, said divider spans an entire width of said van interior, said locking mechanisms removably secure a wheelchair to a floor of the van, said sofa spans the entire width of the van and faces to said divider, said foldable desks fold outward toward said sofa.

\* \* \* \* \*